US007653531B2

(12) United States Patent
Sneddon et al.

(10) Patent No.: US 7,653,531 B2
(45) Date of Patent: Jan. 26, 2010

(54) TRANSLATION QUALITY QUANTIFYING APPARATUS AND METHOD

(75) Inventors: Michael V. Sneddon, Provo, UT (US); Brian R. Chandler, Spanish Fork, UT (US)

(73) Assignee: Multiling Corporation, Provo, UT (US)

( * ) Notice: Subject to any disclaimer, the term of this patent is extended or adjusted under 35 U.S.C. 154(b) by 761 days.

(21) Appl. No.: 11/212,962

(22) Filed: Aug. 25, 2005

(65) Prior Publication Data
US 2007/0050182 A1    Mar. 1, 2007

(51) Int. Cl.
G06F 17/21 (2006.01)
G06F 17/20 (2006.01)
G06F 17/27 (2006.01)
G06F 17/28 (2006.01)
G10L 21/06 (2006.01)

(52) U.S. Cl. .............................. 704/10; 704/2; 704/277
(58) Field of Classification Search ............... 704/1–10, 704/270–271, 276–277
See application file for complete search history.

(56) References Cited

U.S. PATENT DOCUMENTS

| 5,303,151 | A | 4/1994 | Neumann |
| 5,408,410 | A | 4/1995 | Kaji |
| 5,867,811 | A * | 2/1999 | O'Donoghue ................. 704/1 |
| 6,173,259 | B1 * | 1/2001 | Bijl et al. .................... 704/235 |
| 6,345,244 | B1 * | 2/2002 | Clark ........................... 704/2 |
| 6,385,586 | B1 * | 5/2002 | Dietz ......................... 704/277 |
| 6,473,729 | B1 | 10/2002 | Gastaldo et al. |
| 6,546,365 | B1 * | 4/2003 | Gajda et al. .................... 704/8 |
| 6,623,529 | B1 | 9/2003 | Lakritz |
| 6,704,015 | B1 | 3/2004 | Bovarnick et al. |
| 2003/0093261 | A1 | 5/2003 | Abir |
| 2003/0101044 | A1 | 5/2003 | Krasnov |
| 2003/0105621 | A1 | 6/2003 | Mercier |
| 2003/0140316 | A1 | 7/2003 | Lakritz |
| 2003/0140613 | A1 | 7/2003 | Dyer |
| 2003/0154071 | A1 | 8/2003 | Shreve |

(Continued)

FOREIGN PATENT DOCUMENTS

EP    1 227 409    12/2001

(Continued)

OTHER PUBLICATIONS

Microsft Encarta Online Dictionary. Dated Sep. 26, 2003. Accessed via Internet Archive Apr. 14, 2009.*

(Continued)

Primary Examiner—Talivaldis Ivars Smits
Assistant Examiner—David Kovacek
(74) Attorney, Agent, or Firm—Pate Pierce & Baird

(57) ABSTRACT

A system for automating the quality evaluation of a translation. The system may include a computer having a processor and memory device operably connected to one another. A source text in a first language may be stored within the memory device. A target text comprising a translation of the source text into a second language may also be stored within the memory device. Additionally, a plurality of executables may be stored on the memory device and be configured to, when executed by the processor, independently identify a test sample comprising one or more blocks, each comprising a matched set having a source portion selected from the source text and a corresponding target portion selected from the target text.

14 Claims, 13 Drawing Sheets

U.S. PATENT DOCUMENTS

| | | | |
|---|---|---|---|
| 2003/0163300 | A1 | 8/2003 | Kasvand et al. |
| 2003/0182453 | A1 | 9/2003 | Kim et al. |
| 2003/0236658 | A1 | 12/2003 | Yam |
| 2004/0044517 | A1* | 3/2004 | Palmquist ............. 704/7 |
| 2004/0068411 | A1 | 4/2004 | Scanlan |
| 2004/0102956 | A1 | 5/2004 | Levin |
| 2004/0260532 | A1* | 12/2004 | Richardson et al. ............ 704/2 |
| 2005/0021322 | A1 | 1/2005 | Richardson et al. |
| 2005/0038662 | A1 | 2/2005 | Sarich et al. |
| 2007/0033579 | A1* | 2/2007 | Andrews et al. ............ 717/136 |
| 2007/0043552 | A1* | 2/2007 | Omi et al. ............ 704/2 |
| 2007/0050182 | A1* | 3/2007 | Sneddon et al. ............ 704/2 |
| 2007/0083359 | A1* | 4/2007 | Bender ............ 704/9 |
| 2008/0255824 | A1* | 10/2008 | Aso ............ 704/2 |

FOREIGN PATENT DOCUMENTS

| | | |
|---|---|---|
| GB | 2 279 164 | 12/1994 |

OTHER PUBLICATIONS

Jesus Tomas et al., "A Quantitative Method for Machine Translation Evaluation," Apr. 12, 2003, Retrieved from the Internet: http://citeseer.ist.psu.edu/565655.html 8 pages.

Leong, Grace; "Overseas translation teams; software boosts MultiLing's annual growth by 65 percent on average;" The Daily Herald; (Apr. 18, 2004); pp. 1-2; Provo, Utah.

Peterson, Reed; "National Boundaries mean NOTHING!"; Asian Enterprise Magazine; (Sep. 2002);' pp. 1-4.

Multiling, "You have something to say to the world." Promotional pamphlet, Copyright 1994-2005, pp. 1-8.

Multiling, "Products," Product description publication, date unknown, pp. 1.

Multiling, "Translation Workflow Server," Promotional publication, copyright 1994-2005, pp. 1.

Multiling, "A Quick Look at Fortis and Semantis," User's manual, copyright 1998-2005, pp. 1-28.

Focus on Standards: Quality from the Ground Up, http://www.lisa.org/globalizationinsider/2005/03/quality_from_th.html accessed Sep. 28, 2005, pp. 1-6.

Trados Products: The Globalizaton Supply Chain Impacts Your Business, http://www.trados.com/products.asp accessed Sep. 26, 2005, pp. 1-4.

Statistical Process Control, Wikipedia, http://en.wikipedia.org/wiki/Statistical_process_control updated Sep. 23, 2005, pp. 1-2.

Accelerating Global Business, SDL International, SDL.com, revised Jul. 28, 2005, pp. 1-4.

SDL Knowledge-based Translation System- A breakthrough in translation productivity, http://www.sdl.com/products-translation/enterprise-systems/knowledge-based-translation-system.htm accessed Feb. 3, 2005, pp. 1-3.

* cited by examiner

THE PROBLEM

THE SOLUTION

TRANSLATION QUALITY QUANTIFYING APPARATUS AND METHOD

BACKGROUND

1. The Field of the Invention

This invention relates to language translation systems and, more particularly, to novel systems and methods for increasing the objectivity in translating and reviewing translations.

2. The Background Art

As companies grow and expand into global markets, it becomes necessary to globalize the products, services, and supporting documentation they provide. Each such product, service, etc. must be customized to meet the specific cultural, language, legal, and technical requirements of the target market. To be effective, this customization must be provided in a timely, economical, accurate, and repeatable manner.

A large part of the time and expense in preparing a product for a new market is spent in translating owner's manuals, advertising materials, and the like. The magnitude of this time and expense is due to the significant human effort currently required to produce quality translations. For example, currently, even after a translation is "complete," a particular level of quality can only be assured after a highly trained reviewer reads and analyzes a significant portion of the translated document.

It is difficult for a human reviewer to determine how much of what portions of a particular document he or she must read to accurately evaluate the quality of the translation. Thus, a reviewer may typically review and analyze more material rather than less. Typically, a reviewer will review and analyze the entire document. Furthermore, even if one reviewer, through experience, arrives at a reasonable sampling size and frequency, that reviewer may still be unable to arrive at a repeatable result. Moreover, the sampling size and frequency used by one reviewer may be significantly different from that used by another reviewer. Accordingly, there may be significant inconsistencies within the reviewing process.

These and other inconsistencies and time-consuming methods currently in use increase the cost and lower the quality of the translations produced. What is needed is an apparatus and method applying objective, automated quality control or quality assurance to the translation of all types of documents and materials. What is further needed is an apparatus and method integrating this objective quality control into a translation system overseeing and controlling all, or a substantially portion, of the translation process.

BRIEF SUMMARY OF THE INVENTION

In view of the foregoing in accordance with the invention as embodied and broadly described herein, a method and apparatus are disclosed in one embodiment of the present invention as including a translation system comprising various components including translation assisting software, quality quantifying software, and resource managing software. A translation corps may use the tools and functionality provided by the translation assisting software to effectively and predictably translate source documents into target documents. A reviewing corps may use the tools and functionality provided by the quality quantifying software to effectively and objectively determine the quality of the translations produced by the translation corp. The resource managing software may assist management in identifying patterns within the data gathered by the quality quantifying software and provide the framework through which changes and adjustments to the overall system, or the operation thereof, may be communicated and implemented.

In selected embodiments, a repository or database of selected information, programs, electronic documents, and the like may be used by the various software programs and included within a translation system in accordance with the present invention. For example, the translation assisting software may retrieve source (untranslated) documents from, and save target (translated) documents to, the database. Similarly, the quality quantifying software retrieves source and target documents from, and save quality data to, the database. Additionally, the resource managing software may retrieve documents and quality data from, and communicate instructions, projects, changes, and adjustments through, the database.

Operation of a translation system in accordance with the present invention may begin with the selection of a translator from a translation corps of human translators. Using translation assisting software, the translator may retrieve an untranslated, source document, translate the same, and store the resulting, translated, target document. A reviewer from the reviewing corps may then be selected. Using quality quantifying software, the reviewer may retrieve the target document and corresponding source document and objectively evaluate the translation represented therein. In selected embodiments, this evaluation may include the application of a predetermined metric. If the translation passes evaluation with a threshold score, the target document may be finalized. Alternatively, if the translation does not receive at least the threshold score, it may receive a full edit, undergo additional evaluations, or the like.

Operation of the system may continue by storing the evaluation previously determined. Once stored, this evaluation may be combined with previously collected data and analyzed to identify patterns, for example, in document types, content types, translators, and so forth. Once patterns are identified, the allocation of resources may be refined. Suitable refinements may include individual feedback to a particular translator, general feedback to the entire translation corps, adjustment in the number, size, or type of translations allocated to particular translators, adjustments in compensation given particular translators, and the like.

The various steps or tasks for operating a translation system in accordance with the present invention may be divided among the translation assisting software, quality quantifying software, and resource managing software in any suitable manner. For example, in selected embodiments, the translation assisting software may assist a translator in retrieving untranslated documents, translating them, and storing the resulting, translated, target document in the database. The quality quantifying software may assist a reviewer in retrieving the target document and corresponding source document, objectively evaluating the translation represented therein, and storing the evaluation in the database. The resource managing software may assist management in selecting translators, selecting reviewers, identifying patterns, and refining the allocation of resources.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
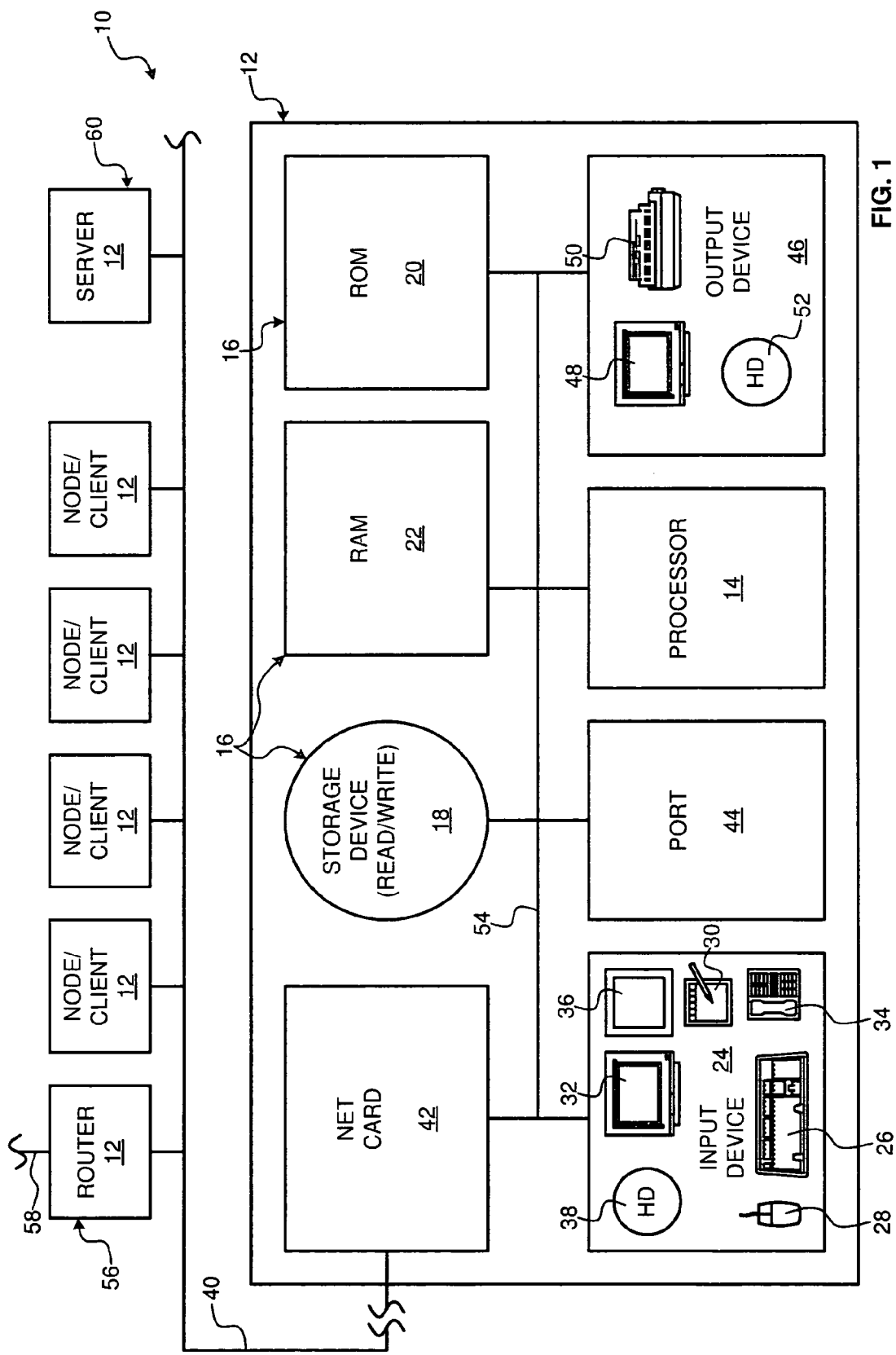
FIG. 1 is a schematic, block, diagram illustrating a computer system for implementing a translation system in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 12 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
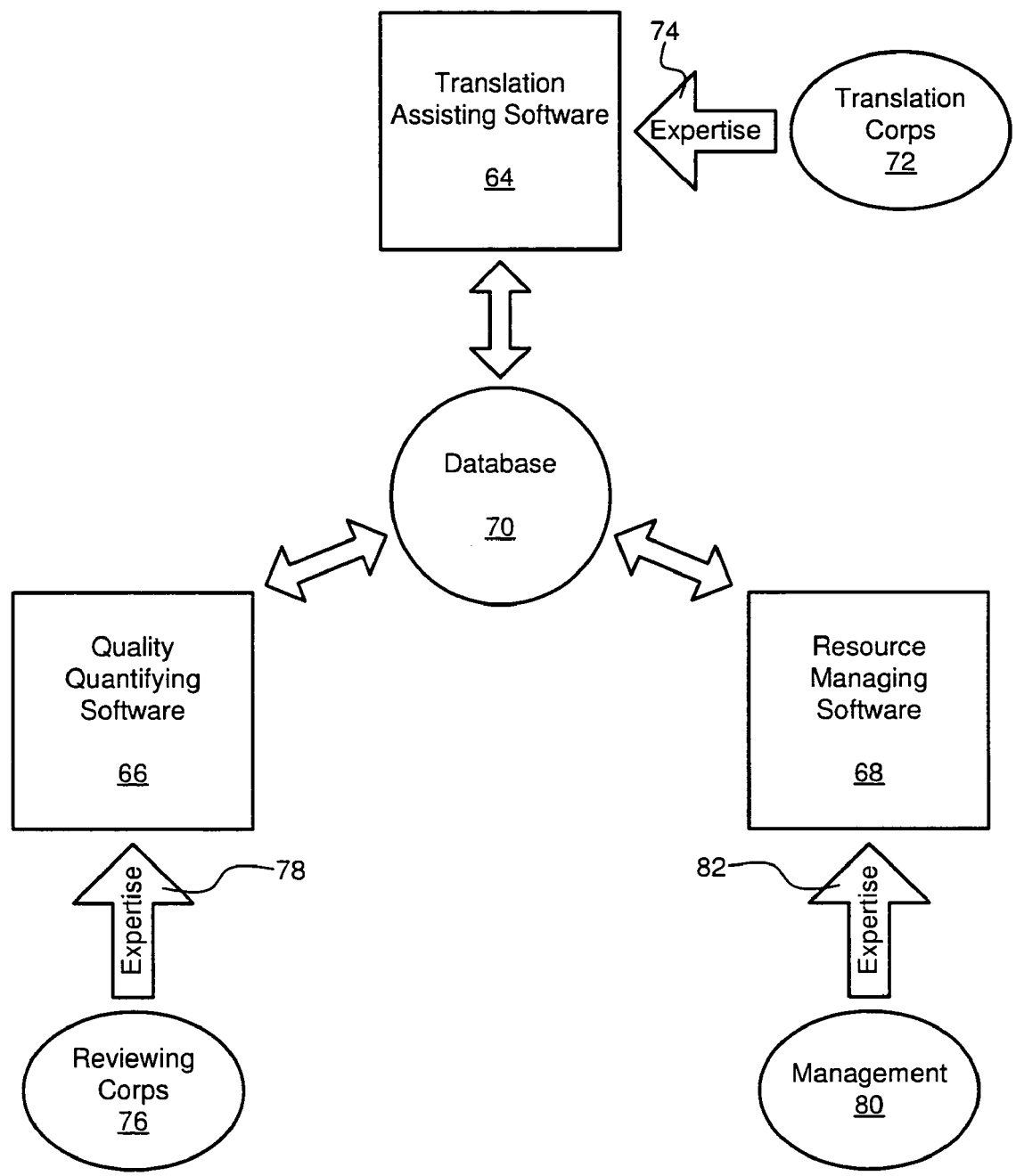
FIG. 2 is schematic, block, diagram providing a high-level overview of a translation system in accordance with the present invention.

Referring to FIG. 2, an apparatus 10 may support a translation system 62 in accordance with the present invention. Such a translation system 62 may include various components including translation assisting software 64, quality quantifying software 66, and resource managing software 68. These components 64, 66, 68 may be embodied in any number of "logical segments of code executable by a processor" (i.e. executables) in one or more memory locations as one or more routines, libraries, or software applications.

For example, in selected embodiments, a single application may have certain functionality directed to assisting translation, other functionality directed to quality quantifying, and still other functionality directed to resource management. In other embodiments, the translation assisting software 64 may be provided by one application, the quality quantifying software 66 may be provided by another application, and the resource managing software 68 may be provided by yet another application. Likewise, all functions could be provided as routines in a library available to another application.

In general, the functionality collectively producing a translation system 62, or any of its components 64, 66, 68, may be provided by any number of applications operating on any number of nodes 12.

In selected embodiments, it may be desirable to provide a repository 70 or database 70 of selected information, programs, electronic documents, and the like accessible to one or more of the other components 62, 64, 66 of a translation system 62. For example, the translation assisting software 62 may require a location 70 from which source (untranslated) documents may be retrieved and in which target (translated) documents may be stored. Similarly, the quality quantifying software 66 may need a location 70 from which source and target documents may be retrieved and in which quality data may be stored. Additionally, the resource managing software 68 may need a location 70 from which finalized documents and quality data may be retrieved and through which instructions, projects, changes, and adjustments may be distributed for implementation.

Accordingly, in selected embodiments, a translation system 62 may include a database 70 operably connected to the other components 64, 66, 68 of the translation system 62. A database 70 may include any collection of information, instructions, data, programs, electronic documents, and the like. In selected embodiments, a database 70 may reside on the memory devices 16 of one or more nodes 12. In other embodiments, a database 70 may be concentrated to a limited number of devices 16 and nodes 12. For example, in certain embodiments, a database 70 may comprise information, documents, etc. stored on the hard drive 18 of a single server 60 or other computer.

One or more human translators may form a translation corps 72. The expertise 74 of the translation corps 72 may be applied to the tools and functionality provided by the translation assisting software 64. Working together, the translation assisting software 64 and the translation corps 72 may effectively and predictably translate source documents into target documents.

Similarly, one or more human reviewers may form a reviewing corps 76. The expertise 78 of the reviewing corps 76 may be applied to the tools and functionality provided by the quality quantifying software 66. Working together, the quality quantifying software 66 and the reviewing corps 76 may effectively and objectively determine the quality of the translations produced by the translation corps 72 and translation assisting software 64.

Using the information gathered and stored by the quality quantifying software 66, management 80 may more accurately determine what changes or adjustments need to be made to improve the quality of the end product. In selected embodiments, the resource managing software 68 may effectively facilitate application of the expertise 82 of management 80 to the most critical issues.

For example, in certain embodiments, the resource managing software 68 may assist management in identifying patterns within the data gathered by the quality quantifying software 66. Additionally, the resource managing software 68 may provide the framework through which changes and adjustments to the overall system 62, or the operation thereof, may be communicated and implemented.

Figure 3:
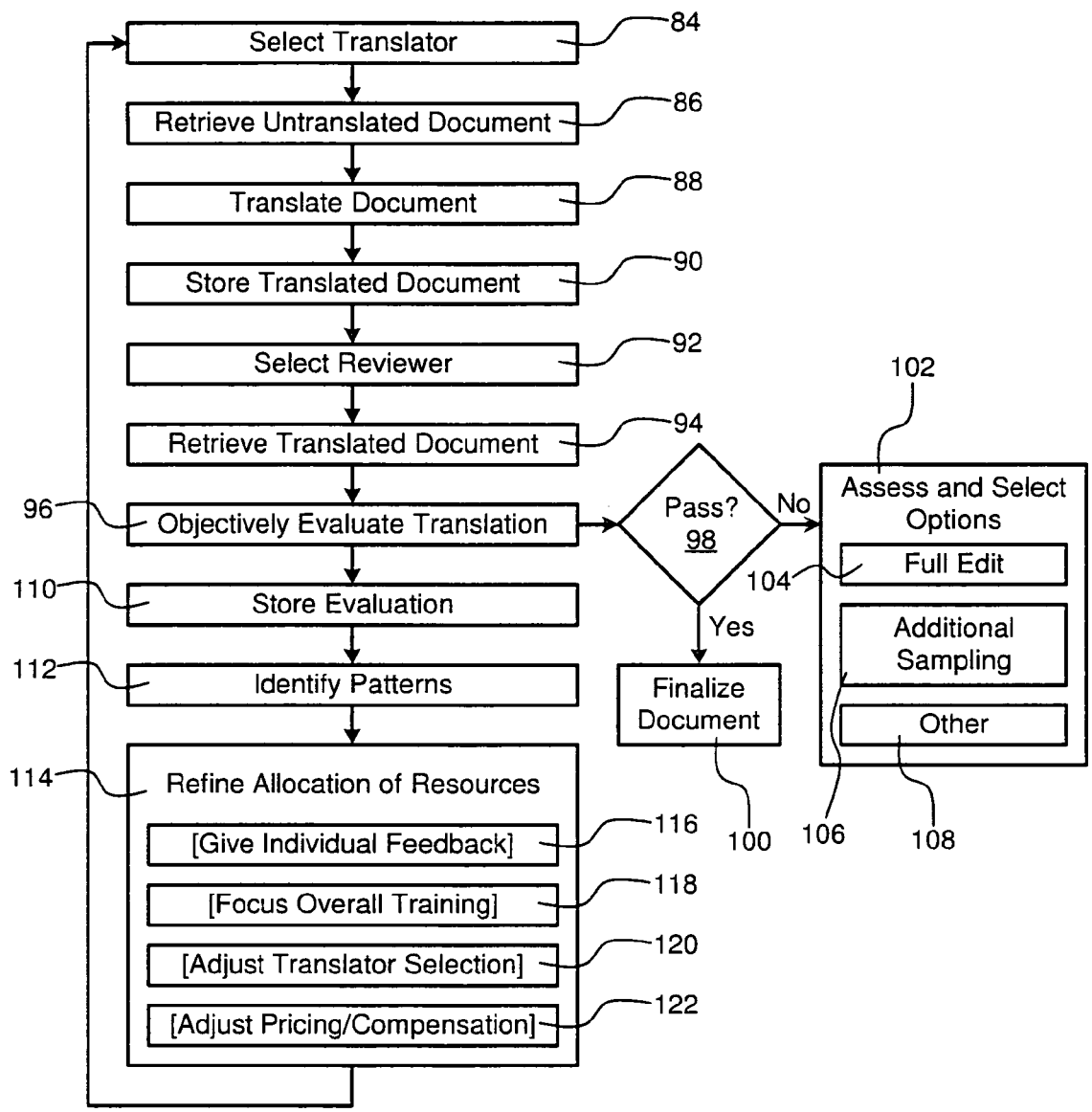
FIG. 3 is block diagram illustrating a possible method of operation for the translation system illustrated in FIG. 2.

Referring to FIG. 3, operation of a translation system 62 in accordance with the present invention may begin with the selection 84 of a translator from the translation corps 72. Using the translation assisting software 64, the translator may retrieve 86 an untranslated, source document, translate 88 the same, and store 90 the resulting translated, target document. In selected embodiments, the translator may store 90 the source document and target document as an associated pair. In selected embodiments, the pair may be associated by a file naming convention. In other embodiments, the pair may be associated by storing 90 both the source document and the target document within the same electronic file.

Operation of the system 62 may continue with the selection 92 of a reviewer from the reviewing corps 76. Using the quality quantifying software 66, the reviewer may retrieve 94 the target document and corresponding source document and objectively evaluate 96 the translation represented therein. In selected embodiments, objectively evaluating 96 the translation may result in the generation of a score (e.g., numeric, categorical, etc.) corresponding thereto. With such a score, a determination 98 may be made as to whether the translation passes a particular threshold of quality. If the translation does pass the threshold score, the target document may be finalized 100. Alternatively, if the translation does not pass with at least the threshold score, other options may be assessed and selected 102.

For example, in selected embodiments, all target documents failing to meet a particular quality threshold may undergo a full edit 104. This edit 104 may include retranslation of problematic portions, correction of grammatical errors, correction of punctuation errors, correction of spelling errors, etc., or any combination thereof. Alternatively, in certain situations, it may be beneficial to conduct additional sampling 106 and review of the target document. This sampling 106 may more accurately determine the quality of the translation. For example, it may determine whether the first evaluation 96 was truly an accurate characterization of the translation. It may also focus efforts and attention on the particular errors that may be largely responsible for decreasing the quality of the translation.

In general, any option 108 improving the quality of the translation, identifying the errors causing the undesirably low quality, and the like may be pursued. For example, in selected embodiments, after a full edit 104, the translation may again be objectively evaluated 96 to determine a score. Accordingly, it may be determined 98 whether the full edit 104 has sufficiently cured the translation to pass the quality threshold.

Operation of the system 62 may continue by storing 110 the evaluation previously determined. Once stored 110, this evaluation may be combined with previously collected data and analyzed to identify 112 various patterns. For example, analysis may reveal that, when translating, a particular translator from the translation corps 72 consistently makes a particular grammatical error. Other patterns may include correlations between quality of translation and years of translation experience, technical background, document content, vocabulary, age, number of years speaking, whether either the source or target language is a native language, and the like.

Once patterns are identified 112, the allocation of resources may be refined 114. The nature of this refinement 114 may depend largely on the nature of the patterns identified. For example, if it is determined that, when translating, a particular translator from the translation corps 72 consistently makes a particular (e.g. grammatical, context, content) error, individual feedback may be given 116 to that individual. This feedback may educate the translator and reduce or eliminate the recurrence of that error in his or her future translations.

Other refinements 114 may include a change 118 in the focus of the overall training given the translation corps 72. This may be particularly useful when particular errors are being found in the translations of a significant number of translators. For example, this overall training may educate the translation corps 72 regarding a new feature of the translation assisting software 64 recently added to address a particular concern.

In situations where, after multiple feedback sessions, a particular translator's work continues to evidence a particular error, the criteria for selection 84 of that translator may be adjusted 120. For example, the criticality, content, or subject matter submitted may be limited, or employment of that particular translator may be terminated. Alternatively, the work assigned to that translator may be adjusted to better conform to his or her abilities based on time, cost, content, or the4 like available and matched to output of the translator.

In selected embodiments, the allocation of resources may be refined 114 to adjust 122 the pricing or compensation associated with particular clients or translators. For example, if it is determined that a particular translator consistently receives high quality scores on his or her translations, economic compensation of that translator may be increased. This may increase the ability, motivation, or both of that translator to continue employment with the particular business. Accordingly, the business may better protect its most profitable human assets. Conversely, compensation of any translator consistently producing translations below selected quality levels may be lowered 112 to more accurately reflect the true value of the work produced.

The price charged to translate selected documents may also be adjusted 122. For example, if it is determined that translations for a particular client are sufficiently complex or technical that full edits 104 are routinely required, then the price charged for those translations may be adjusted 122 to more accurately reflect the work involved. Similarly, if a client demands a particular quality level for its translations, the amount of extra work necessary to produce and verify that quality of work may be accurately determined and the price charged that client may be adjusted 122 accordingly.

The various steps or tasks described hereinabove for operating a translation system 62 in accordance with the present invention may be divided among the various components 64, 66, 68, 70 of the system 62 in any suitable manner. For example, in selected embodiments, the translation assisting software 64 may assist a translator in retrieving 86 untranslated documents, translating 88 the same, and storing 90 the resulting, translated, target document in the database 70. The quality quantifying software 66 may assist a reviewer in retrieving 94 the target document and corresponding source document, objectively evaluating 96 the translated represented therein, and storing 110 the evaluation in the database 70. The resource managing software 68 may assist management 80 in selecting 84 translators, selecting 92 reviewers, identifying 112 patterns, and refining 114 the allocation of resources.

Similarly, determining 98 whether a translation passes a quality threshold, finalizing documents 100, and assessing and selecting options 102 may be divided among the various components 64, 66, 68, 70 of the system 62 in any suitable manner. For example, in selected embodiments, the quality quantifying software 66 may be responsible for determining 98 whether a translation passes a quality threshold, while the resource managing software 68 may be responsible for finalizing documents 100 in preparation for their being sent to the client. Additionally, the resource managing software 68 may be responsible for assessing and selecting options 102, but may instruct the reviewing corps 76 to use the quality quantifying software 66 in conducting the full edit 104 or additional sampling 108.

Figure 4:
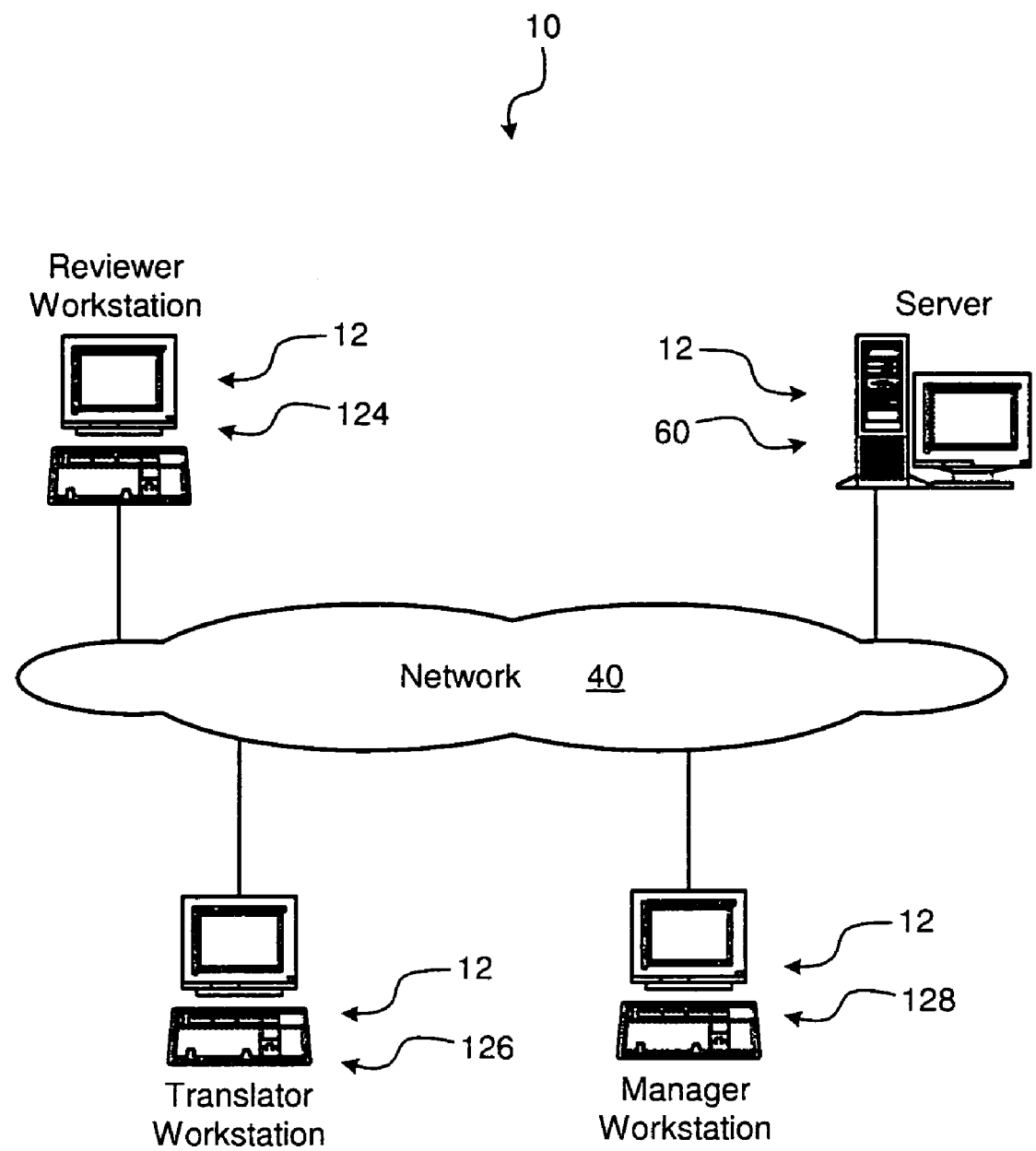
FIG. 4 is a schematic diagram of one embodiment of a network capable of implementing a translation system in accordance with the present invention.

Referring to FIG. 4, in selected embodiments, a business providing translation services may employ a centrally located translation corps 72, reviewing corps 76, and management 80. In other embodiments, a business providing translation services may employ a translation corps 72, reviewing corps 76, and management 80 comprising individuals residing all over the world. Systems 62 in accordance with the present invention may meet the needs of both such business methods, as well as others employing hybrid methodologies.

For example, in selected embodiments, one or more servers 60, reviewer workstations 124, translator workstations 126, and manager workstations 128 may be connected via a network 40. The one or more servers 60 may support the database 70. The one or more reviewer workstations 124 may be programmed to include the quality quantifying software 66. The one or more translator workstations 126 may be programmed to include the translation assisting software 64. The one or more manager workstations 128 may be programmed to include the resource managing software 68 to administer assignment of and follow up of on work projects.

The network 40 may be scaled in any suitable method to meet the geographical requirements imposed by the location of the various computers 60, 124, 126, 128. For example, in selected embodiments, the network 40 may comprise a local area network (LAN). In other embodiments, the network 40 may comprise the Internet. In still other embodiments, the network 40 may comprise a wide area network (WAN), VPN, or local area network operably connected to the Internet.

Communication between the various computers 60, 124, 126, 128 and the operators 72, 76, 80 thereof may be carried out in any suitable manner. For example, in selected embodiments, one or more servers 60 may host a website on the Internet. The individuals forming the translation corps 72, reviewing corps 76, and management 80 may be equipped with user names and passwords granting them access to information contained within that website (e.g. a database 70). Accordingly, a translator may access the website to retrieve an appropriate source document ready for translation, a reviewer may access the website to retrieve a source document and target document pair ready for evaluation, etc.

If desired, such a website may support or provide an agenda for each individual. An agenda may list all of the tasks current assigned to a particular individual. The agenda may also link to the materials necessary or helpful for performing the particular tasks. The website may also limit an individual's access to materials relating to non-pertaining tasks. The website may also form the delivery mechanism for delivering individual feedback 116, general training 118, and the like.

In other embodiments, communication between the various computers 60, 124, 126, 128 and the operators 72, 76, 80 thereof may be carried out via e-mail. For example, management 80 may e-mail an assignment or project to a translator. When completed, the project may be e-mailed back to management 80. A similar process may be followed in communicating with reviewers from the reviewing corps 76. If desired, the resource managing software 68 may automate, to a certain degree, such e-mails.

For example, management 80 may use the resource managing software 68 to prepare a source document for translation. The software 68 may then automatically select a qualified translator from the translation corps 72 according to some rotation scheme and send an e-mail with the source document to that translator. The translator may then respond and accept or reject that project. If the translator accepts the project, the resource managing software 68 may so note. On the other hand, if the translator rejects the project, the resource managing software 68 may select the next qualified translator according to the rotation scheme, and the process may continue.

In still other embodiments, more conventional methods of communication may be employed. For example, in some embodiments, communication by air or ground mail, telephone, facsimile, etc. may be sufficient. If desired, multiple forms of communication may be employed. For example, using a telephone, management 80 may confirm a translator's ability and desire to complete a selected project, but use e-mail to send source documents to the translator in electronic format.

Figure 5:
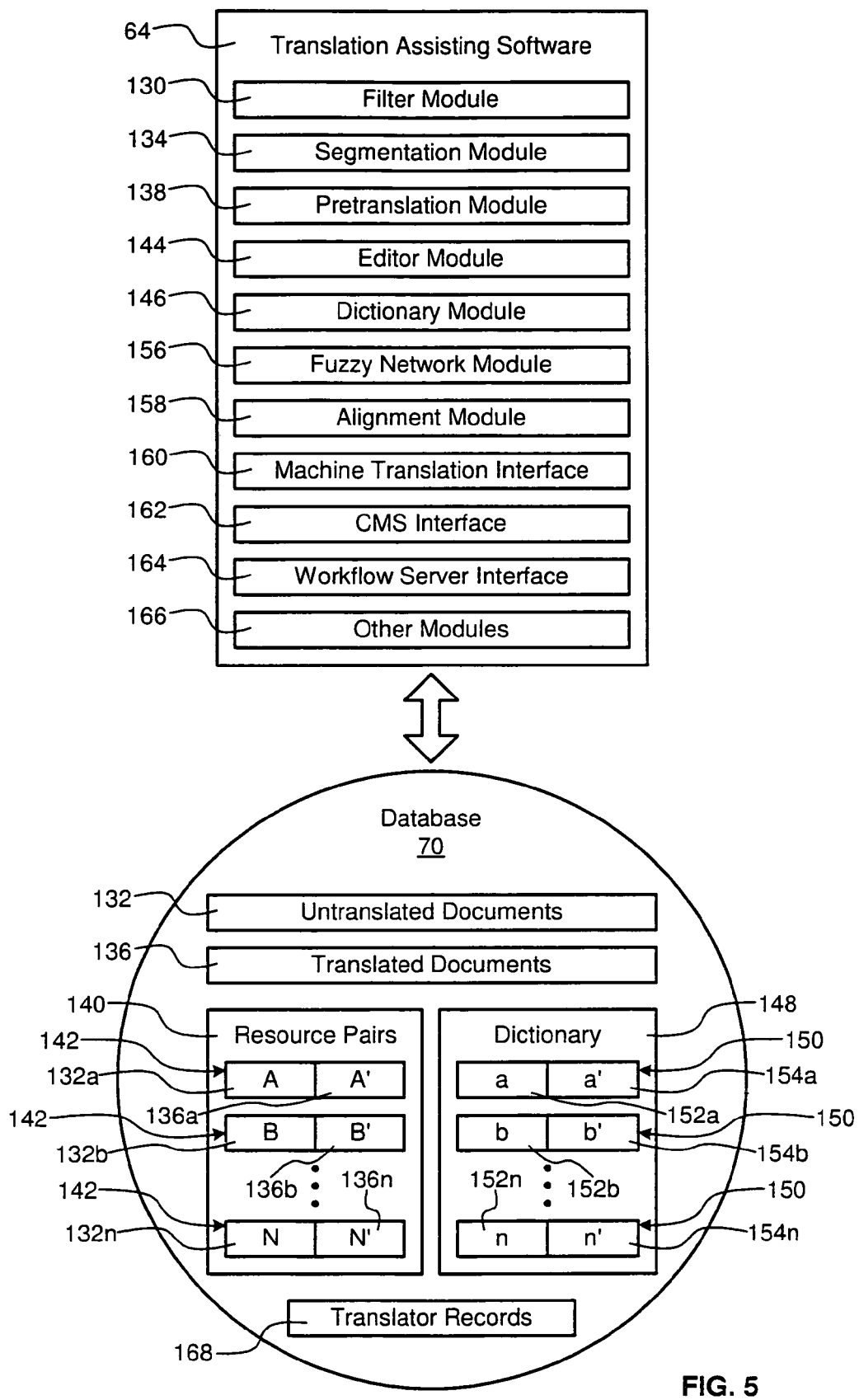
FIG. 5 is a schematic, block, diagram illustrating one embodiment of translation assisting software comprising various possible modules and a corresponding database for storing information and records used by the translation assisting software in accordance with the present invention.

Referring to FIG. 5, translation assisting software 64 in accordance with the present invention may provide any desirable functionality. In general, this functionality may be represented in one or more modules. For example, in selected embodiments, translation assisting software 64 may include a filter module 130 for separating content from format. For example, using the translation assisting software 64, a translator may retrieve from a data base 70 an untranslated document 132 or source document 132. This document 132 may have two characteristic aspects, namely, the content comprising the words or text and the format comprising the font, line spacing, paragraph separation, text positioning on the page, etc. Accordingly, a filter module 130 may separate the content from the format. Thus, the translator may focus on translation of the content, without regard to the format.

In certain embodiments, translation assisting software 64 may include a segmentation module 134. A segmentation module 134 may divide the content of a source document 132 into distinct phrases, each representing a particular thought. Accordingly, a translator may translate the source document 132 phrase by phrase. In selected embodiments, the segmentation module 134 may largely rely on punctuation in determining how the source document 132 may best be divided.

In selected embodiments, once a source document 132 is segmented, a segmentation module 134 may duplicate the source document 132 to form a translated document 136 or target document 136. At first, a target document 136 may be identical to a source document 132. However, as a translator translates, he or she may replace the phrases of the target document 136 with new phrases comprising a translation of the old phrase into the target language. Accordingly, when translation is complete, the target document 136 may comprise a phrase-by-phrase translation of the source document 132.

Translation assisting software 64 in accordance with the present invention may include a pretranslation module 138 for leveraging (e.g. re-using, consulting) translations previously completed, reviewed, and approved to speed the translation of new material. In selected embodiments, a pretranslation module 138 may compare the segments or phrases of a current, uncompleted target document 136 to a collection 140 of resource pairs 142. Each resource pair 142 of such a collection 140 may include a source document 132a, 132b, 132n coupled to a corresponding, completed target document 136a, 136b, 136n.

When a pretranslation module 136 finds a phrase in a current target document 136 identical to a phrase in a source document 132a of a resource pair 142, the pretranslation module 138 may identify the corresponding translated phrase in the corresponding target document 136a of the resource pair 142. The pretranslation module 138 may then replace the phrase in the current target document 136 with the translated phrase extracted from the resource pair 142. In this manner, duplicate effort may be avoided, the efficiency of the translation process may be increased, and objectivity and consistency in translation may improved.

In selected embodiments, translation assisting software 64 in accordance with the present invention may include an editor module 144 to provide an interface between the software 64 and the translator. In certain embodiments, an editor module 144 may provide various viewing windows on a monitor 48 corresponding to a computer 12 executing the translation assisting software 64. An editor module 144 may also support editing of the text contained within one or more of those windows.

For example, in one embodiment, an editor module 144 may support a first window displaying a selected portion of the source document 132 and second window displaying a corresponding portion of the target document 136. They may be registered vertically and synchronized. Accordingly, when a translator scrolls to change the portion of the source document displayed within the first window, the editor module 144 may simultaneously adjust the portion of the target document 136 displayed within the second window. Similarly, altering the portion of the target document 136 displayed within the second window may simultaneously alter the portion of the source document 132 displayed within the first window. An editor module 144 may support editing of the text within either of the first and second widows as desired or necessary.

In certain embodiments, translation assisting software 64 may include a dictionary module 146 to speed the translation of individual words. In selected embodiments, a dictionary module 146 may compare words of a current, uncompleted target document 136 to a dictionary 148 comprising various word pairs 150. Each word pair 150 of such a dictionary 148 may include a word 152a, 52b, 152n in a source language coupled or otherwise matched to a word 154a, 154b, 154n, of the same meaning and usage, in a target language.

When a dictionary module 146 finds a word in a current target document 136 also located in a word pair 150 of the dictionary 148, the dictionary module 146 may swap the word for its translation. Alternatively, the dictionary module 146 may prompt the editor module 144 to indicate the availability of a translation for the word.

For example, when notified by the dictionary module 146 that a particular word is also located in a word pair 150 of the dictionary 148, the editor module 144 may highlight the word (i.e., change the color of the word, underline the word, etc.)

according to a predetermined convention. Accordingly, the translator may be informed that a translation for that particular word may be found in the dictionary 148.

In selected embodiments, the translator may view the translation contained with the dictionary 148 by clicking on or otherwise selecting the highlighted word. This may launch a new window displaying the word, its translation, meaning, sample uses, etc. Alternatively, this may simply bring the word, its translation, meaning, sample uses, etc. to view in a predesignated window reserved for displaying dictionary information on the screen of the monitor 48. If desired, a virtual button or other command arrangement may be included to enable a translator to swap the untranslated word for its translation in the current target document 136.

In certain embodiments, translation assisting software 64 may include a fuzzy network module 156. Such a module 156 may assist the pretranslation module 138 in locating relevant phrases from within the collection 140 of resource pairs 142, even when the phrases contained with the collection 140 are not identical to those in the target document 136. In selected embodiments, the fuzzy network module 156 may cooperate with the editor module 144 to permit a translator to modify the similar translated phrase retrieved from the collection 140 or resource pairs 142 before incorporating the same into the current target document 136.

In some situations, a translator may have in his or her possession significant quantities of source and target documents 132, 136 that were not generated using translation assisting software 64 in accordance with the present invention. Such resources may not be immediately available for incorporation within a collection 140 of resource pairs 142 to be leveraged in future translations. Accordingly, translation assisting software 64 in accordance with the present invention may include an alignment module 158. Such a module 158 may cooperate with the filter module 130 and segmentation module 134 to convert such documents 132, 136 into resource pairs.

For example, electronic files representing corresponding source and target documents 132, 136 may be loaded into the translation assisting software 64. The filter module 130 may separate the content of the documents 132, 136 from the format. The segmentation module 134 may divide both the source document 132 and the target document 136 into segments or phrases. Finally, the alignment module 158 may compare and align the segments or phrases of the source document 132 with the appropriate segments or phrases of the target document 136. A segment may be a word, a clause, a sentence, a paragraph, or other convenient demarcation.

In selected embodiments, an alignment may highlight any areas where the two documents 132, 136 do not appear to match. Accordingly, the translator may manually generate, align, etc. those particular problematic segments. Following such procedures, the translation assisting software 64 may enrich the collection 140 of resource pairs 142 and take advantage of various source and target documents 132, 136, regardless of their origins.

In certain embodiments, it may be desirable for translation assisting software 64 in accordance with the present invention to cooperate with other external or diverse software applications. Accordingly, translation assisting software may include various interfacing modules facilitating interaction with such applications. For example, in selected embodiments or situations, it may be desirable to include a machine translation interface 160. Such an interface 160 may support two way communication with computer systems and applications programmed to produce complete translations.

In some embodiments, translation assisting software 64 in accordance with the present invention may include a Control Management System (CMS) interface 162. This interface 162 may facilitate interaction with a Control Management System to analyze text, read files, pass statistical information, pass project descriptions, pass translational parameters to aid in translation, etc. Similarly, a workflow server interface 164 may facilitate interaction with a workflow server (possibly included as part of the resource managing software 68), controlling the flow of projects to and from the various translators of the translation corps 72.

In addition to the modules and interfaces discussed hereinabove, translation assisting software 64 may include other modules 166 as desired or necessary. In general, these other modules 166 may provide additional functionality to improve the efficiency, adaptability, ease of use, etc. of the translation assisting software 64. For example, in selected embodiments, these other modules 166 may include a translator module. Such a module may form an association between the translator and the resulting target document 136. Accordingly, a translator module may generate a translator record 168 within the database 70 identifying a translation with the person who produced it.

Figure 6:
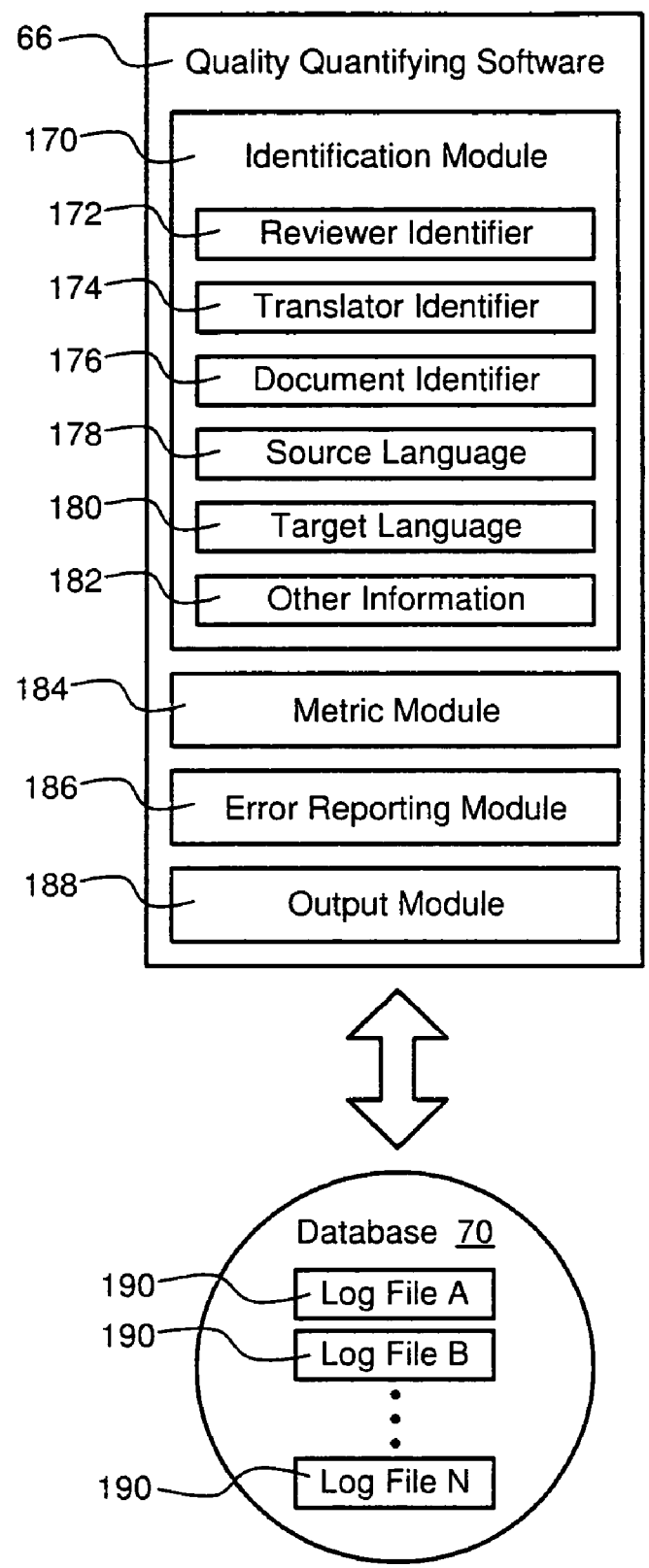
FIG. 6 is a schematic, block, diagram illustrating one embodiment of quality quantifying software comprising various possible modules (e.g. typically, "executables") and a corresponding database for storing information and records used by the quality quantifying software in accordance with the present invention.

Referring to FIG. 6, quality quantifying software 66 in accordance with the present invention may provide any desirable functionality. In general, this functionality may be represented in one or more modules. For example, in selected embodiments, quality quantifying software 66 may include an identification module 170 to collect and store selected information that may be useful for quality control purposes. For example, an identification module 170 may include an identifier 172 indicating which reviewer from the reviewing corps 76 reviewed the translation, an identifier 174 indicating which translator from the translation corps 72 generated the translation, an identifier 176 indicating the exact document at issue, information 178 regarding the source language, information 180 regarding the target language, and any other information 182 that may useful or statistically important.

In selected embodiments, quality quantifying software 66 in accordance with the present invention may also include a metric module 184 defining the threshold values, sampling procedures, etc. for making quality evaluations, an error reporting module 186 to facilitate collection of information regarding the particular errors located in a translation, and an output module 188 for compiling the information obtained by the quality quantifying software 66 and storing the same in one or more log files 190. In certain embodiments, one log file 190 may be generated for each document whose translation is reviewed.

In addition to the modules discussed hereinabove, quality quantifying software 66 may include other modules as desired or necessary. In general, these other modules may provide additional functionality to improve the efficiency, adaptability, objectivity, repeatability, ease of use, etc. of the quality quantifying software 64.

Figure 7:
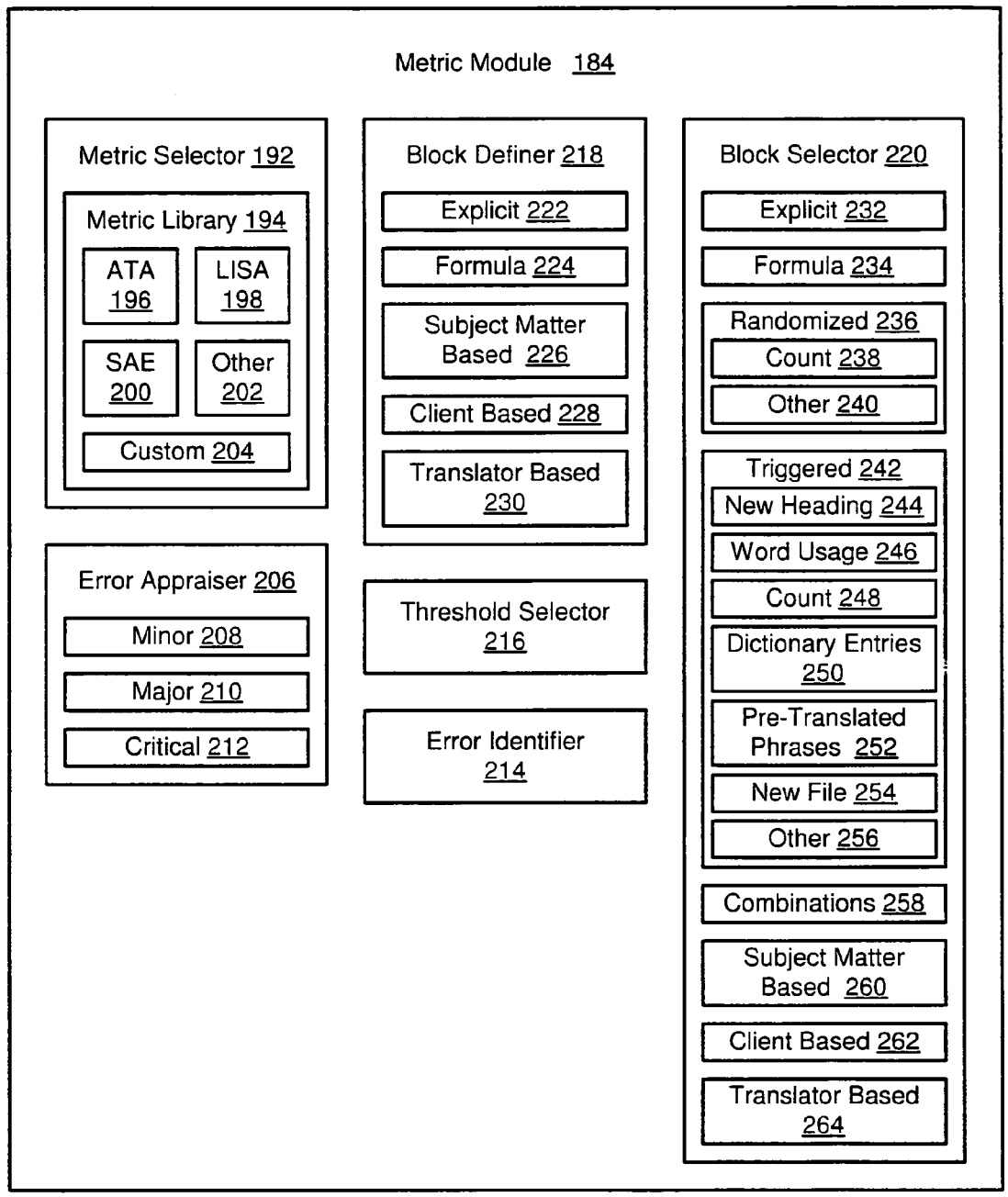
FIG. 7 is a schematic, block, diagram illustrating one embodiment of a metric module for incorporation within quality quantifying software in accordance with the present invention.

Referring to FIG. 7, in selected embodiments, a metric module 184 may support a metric selector 192 permitting a reviewer to select the particular metric or metrics to be applied in the reviewing process. In certain embodiments, a metric selector 192 may present a reviewer with a metric library 194 listing the various metrics from which the reviewer may choose. In one embodiment, a metric library 194 may permit a user to choose a metric based on standards promulgated by the American Translators Association (ATA) 196, the Localization Industry Standards Association (LISA) 198, a technical society, like the Society of Automotive Engineers (SAE) 200, or the standards promulgated by some other organization 202. Additionally, the metric library 194 may support the creation and selected of a custom metric 204 developed for a particular project or based on wide experience in evaluating translations in accordance with the present invention.

In selected embodiments, the metric to be applied may be dictated by a client or by management 80. Accordingly, metric selection may be outside of the discretion of the reviewer.

In some embodiments, a metric module 184 may support an error appraiser 206 defining the various classifications or magnitudes of translational errors. In selected embodiments, a reviewer may use the error appraiser 206 to define these classifications or magnitudes of errors. Alternatively, the metric selected from the metric library 194 may define classifications or magnitudes.

In selected embodiments, an error appraiser 206 may define multiple, for example, three, classes or magnitudes of errors, namely, minor 208, major 210, and critical 212. The error appraiser 206 may also assign the points associated with each class of error. For example, a minor error may be assigned a value of one point, a major error may be assigned a value of five points, and a critical error may be assigned however many points are needed to ensure that the translation fails to meet the corresponding quality threshold.

A metric module 184 may also support an error identifier 214 and a threshold selector 216. An error identifier 214 may articulate the various types of errors for which a translation is to be searched. The threshold selector 216 may define what comprises a passing score for a translation. In selected embodiments, the particular errors articulated by the error identifier 214 as well as the threshold value defined by the threshold selector 216 may be defined by a reviewer on a project-by-project basis, client-by-client basis, etc. Alternatively, the metric selected from the metric library 194 may define the threshold value and articulate the various types of errors for which a translation is to be searched.

In certain embodiments, review of a translation may comprise a detailed review of one or more samples extracted from the translation. A sample of the translation may be considered a block. Accordingly, a metric module 184 may include a block definer 218 and a block selector 220. The block definer 218 may define the scope of the block or sample. The block selector 220 may define how that block or sample is selected. In selected embodiments, the methodologies used by the block definer 218 and block selector 220 may be defined by a reviewer on a project-by-project basis, client-by-client basis, etc. Alternatively, the metric selected from the metric library 194 may articulate the methodologies used by the block definer 218 and block selector 220.

A block definer 218 may define the scope of a block or sample in any statistically acceptable manner. In selected embodiments, the scope of a block may be explicitly 222 set forth. For example, the block definer 218 may dictate that a block comprise a particular number of sequential words. Alternatively, the scope of a block may be defined accordingly to a formula 224. For example, a block definer 218 may dictate that a block comprise a number of sequential words equal to the greater of a particular value or some percentage of the total word count.

In selected embodiments, the method in which a block is defined may vary from project to project. For example, block definition may be based on the subject matter 226 of the translations. Accordingly, translations involving complex, technical terminology may receive more intensive scrutiny. Similarly, block definition may be based on the particular client 228 whose document are being translated. For example, a client may specifically request a particular block size. Additionally, block definition may be based on the translator 230. For example, the size of a block for new translators may be different from the size of a block for experienced translators.

A block selector 220 may define how a block or sample is selected in any statistically acceptable manner. Similar to the block definer 218, the selection of a block by a block selector 220 may typically be explicit 232 or by formula 234. Additionally, the selection of a block may be randomized 236. In some embodiments, this randomization 236 may be based on a count 238 (e.g., number of words, number of sentences, number of paragraphs, number of pages, etc.). Alternatively, the randomization 236 may be based on some other 240 criteria.

In certain embodiments, the selection of a block by a block selector 220 may be triggered 242. That is, some occurrence within the document may trigger the selection of a block. Suitable triggers may include new headings 244 within the documents, changes in word usage 246 within the document, various counts 248 extracted from the documents, a change 250 in density or percentage of dictionary entries (i.e., words in the document that are also in the dictionary 148), a change 252 in the density or percentage of pre-translated phrases (i.e., phrases located in a resource pair 142), transitions 254 to new files (e.g., electronic document files), and the like.

In additional to those listed hereinabove, other triggers 256 may be used in block selection. In general, any trigger that may indicate a change in the subject matter of the document may be useful. These triggers highlight areas within the document where different translational skills may be tested and, accordingly, additional scrutiny may be needed.

A block selector 220 in accordance with the present invention may use any combination 258 of explicit 232, formula 234, randomized 236, or triggered 242 methodologies to define how a block or sample is selected. For example, in some embodiments, a first block may be selected according to an explicit 232 command, while subsequent blocks are selected by formula 234, at random 236, or by a trigger 242.

In selected embodiments, the method in which a block is selected may vary from project to project. For example, block selection may be based on the subject matter 260 of the translations, the particular client 262 whose documents are being translated, or the translator 264. Accordingly, translations involving complex, technical terminology may receive more intensive scrutiny, a client may specifically request a particular block selection method, the selection of blocks for new translators may be different from the selection method used for experienced translators, and the like.

Figure 8:
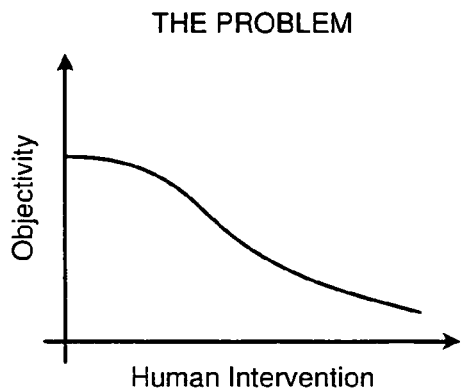
FIG. 8 is a graph illustrating an inverse correlation between objectivity and human intervention.

Referring to FIG. 8, objectivity may be defined as the ability to conduct a thorough and accurate analysis, without distortion by personal feelings, prejudices, or interpretations. To produce a consistent and repeatable quality analysis or evaluation of a translation, a certain amount of objectivity must be present. This is particularly so when these evaluations are conducted my multiple reviewers.

Generally speaking, when quantifying or evaluating the quality of a translation, the objectivity of that evaluation vary inversely with human intervention. Accordingly, a greater amount of human intervention typically produces a decrease in objectivity. Conversely, by limiting human intervention, objectivity may be increased.

Figure 9:
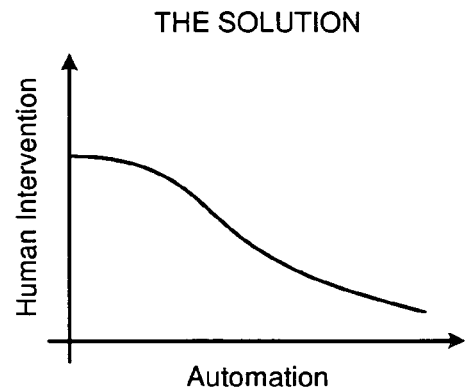
FIG. 9 is a graph illustrating an inverse correlation between human intervention and automation.

Referring to FIG. 9, one method of reducing human intervention, and thereby increasing objectivity, is to automate as many of the evaluation steps and decisions as possible. In automation, decisions that would otherwise be made by human beings may be handled by machines (e.g., computers), whose strengths lie in their ability to precisely following predetermined paths and instructions. A machine may be as objective as the underlying paths or instructions it follows. Accordingly, human effort may be focused on honing the paths and instructions, trusting that once they are sufficiently refined in their statistical significance and objectivity, they will be executed precisely and repeatably by the machine.

Figure 10:
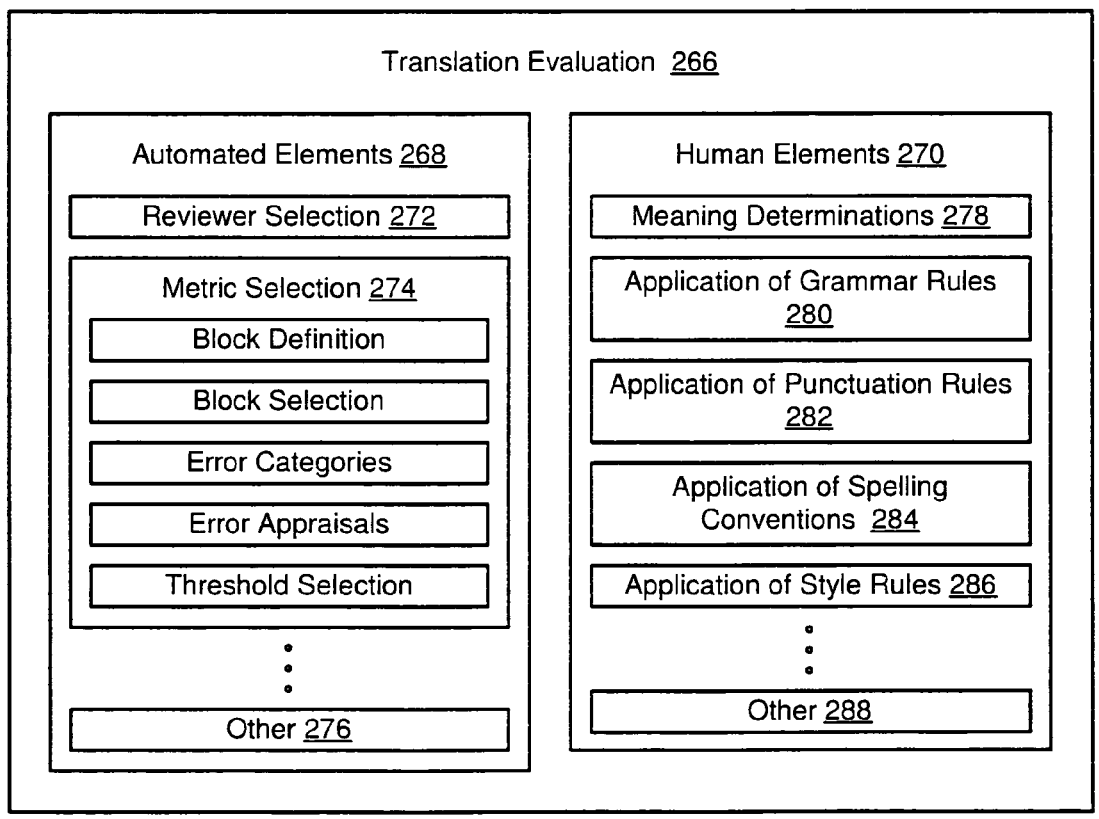
FIG. 10 is a block diagram illustrating various automated elements and human elements that may be include in a translation evaluation in accordance with the present invention.

Referring to FIG. 10, a translation evaluation 266 in accordance with the present invention may be divided into automated elements 268 and human elements 270. Automated elements 268 of a translation evaluation 266 may include reviewer selection 272. For example, a computer may randomly selected the reviewer for a particular translation from a list of qualified reviewers. Other automated elements 266 may include metric selection 274. For example, it may be determined that all translations for a particular client are to be evaluated using a particular metric. In selected embodiments, other elements 276 or task 276 may also be automated as desired or necessary.

With the selection 274 of the particular metric, a host of decisions may be removed from the discretion of the human reviewer. For example, selection 274 of a metric may automatically determine how blocks are to be defined, how blocks are to be selected, the various error categories or types of error for which a block will be evaluated, the point value for the various errors, the threshold "passing score," and the like.

Moreover, in selected embodiments, the quality quantifying software 66 may implement these elements 272, 274. For example, a metric may dictate the methods to be used in block definition and block selection, and the software 66 may size and select blocks accordingly. Thus, the software 66 may simply present the reviewer with the blocks of text he or she is to review. In this manner, the objectivity of the evaluation 266 may be greatly increased as the human intervention that may otherwise exist in defining and selecting blocks has been substantially limited.

Human elements 270 of a translation evaluation 266 may include meaning determinations 278. These may include judgements as to whether a particular portion of the target document accurately reflects the meaning of the source document. Other human elements 270 may include the application of the rules of grammar 280, rules of punctuation 282, spelling conventions 284, and style rules 286. In selected embodiments, a translation evaluation 266 may include other human elements 288 or tasks 288 as desired or necessary.

Figure 11:
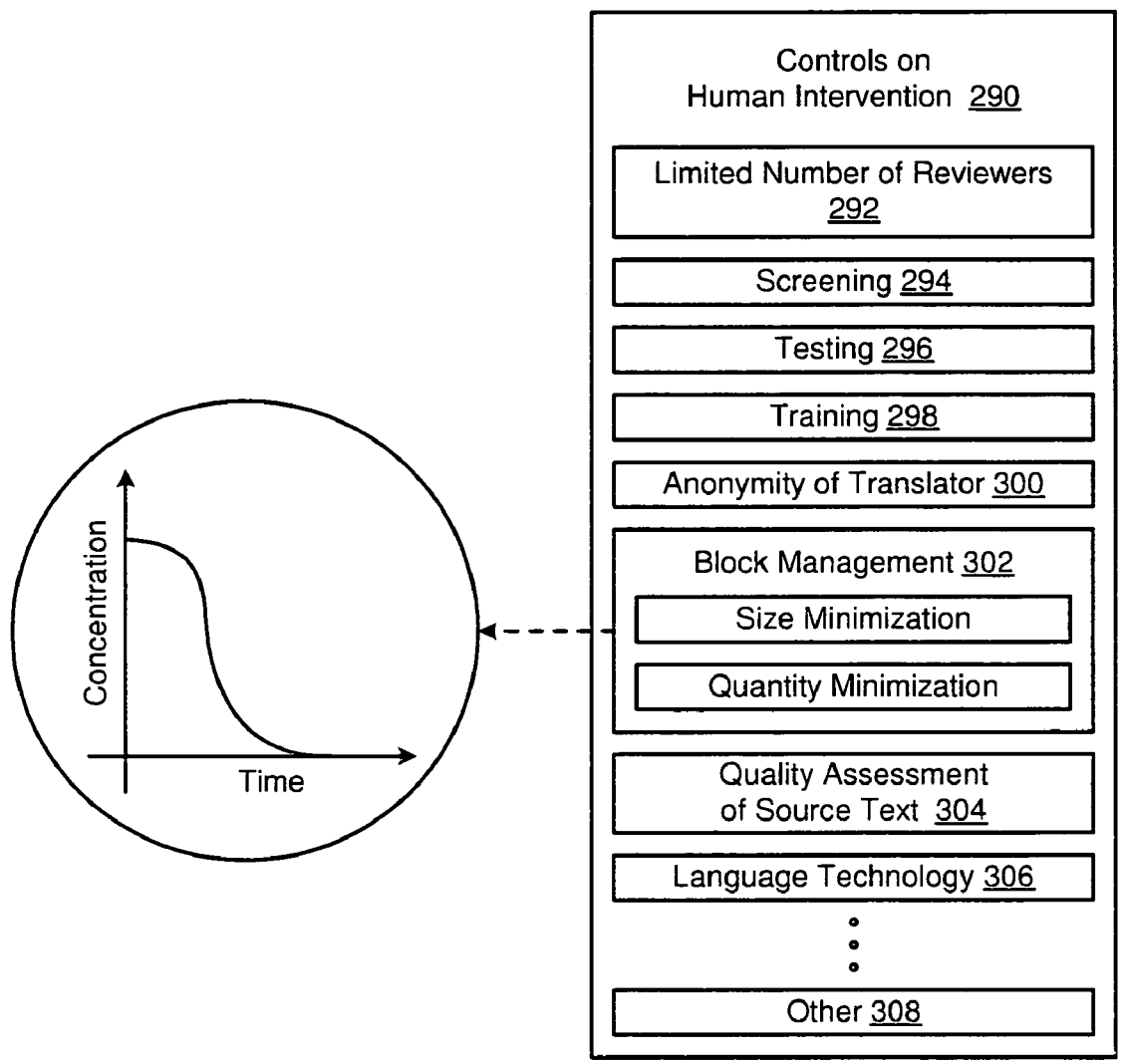
FIG. 11 is a block diagram illustrating various controls that may be placed on the human elements in a translation evaluation in accordance with the present invention.

Referring to FIG. 11, while it may be difficult to automate all of the tasks involved in a translation evaluation 266, selected embodiments in accordance with the present invention may incorporate controls 290 on the remaining elements 270 that are to be performed by human reviewers. These controls 290 may improve the objectivity of the human elements 270.

For example, one control 290 may be to limit 292 the number of reviewers employed. By limiting 292 the number of reviewers, the limited resources available to supervise and train the reviewing corps 76 may be more densely applied. Other controls 290 may include intensive screening 294 and testing 296 to determine those qualified to populate the reviewing corps 76, training 298 to improve the skill and understanding of the reviewing corps 76, anonymity 300 of the translators whose work is being reviewed, and block management 302.

In selected embodiments, block management 302 may limit or minimize the size and quantity of blocks a reviewer must examine during a particular translation evaluation 266. Generally speaking, human attention and concentration decrease with the passage of time. Accordingly, a reviewer may more thoroughly evaluate a short block than a lengthy block. Thus, the size of each block may be minimized to a limit determined by the statistical significance thereof. Similarly, the number of blocks selected may be minimized to a limit determined by the statistical significance thereof.

In certain embodiments, the quality of a source document may limit the quality of the resulting target document. For example, if there is an ambiguity in the source document, it is very likely that this ambiguity will be passed on to the target document, thereby reducing the quality thereof. Accordingly, another control 290 on human intervention may include an assessment 304 of the quality of the source document. This assessment 304 may provide an opportunity to improve the source document. Alternatively, it may adjust the expectations or ceiling score applied to the target document.

Another control 290 on human intervention may be the continued progression of language technology 306. As this technology 306 continues to develop, additional elements 270 currently performed by humans may eventually become automated elements 268. In addition to the controls 290 on human intervention in translation evaluation 266 described hereinabove, other methods 308 for exerting control may be implemented as desired or necessary.

Figure 12:
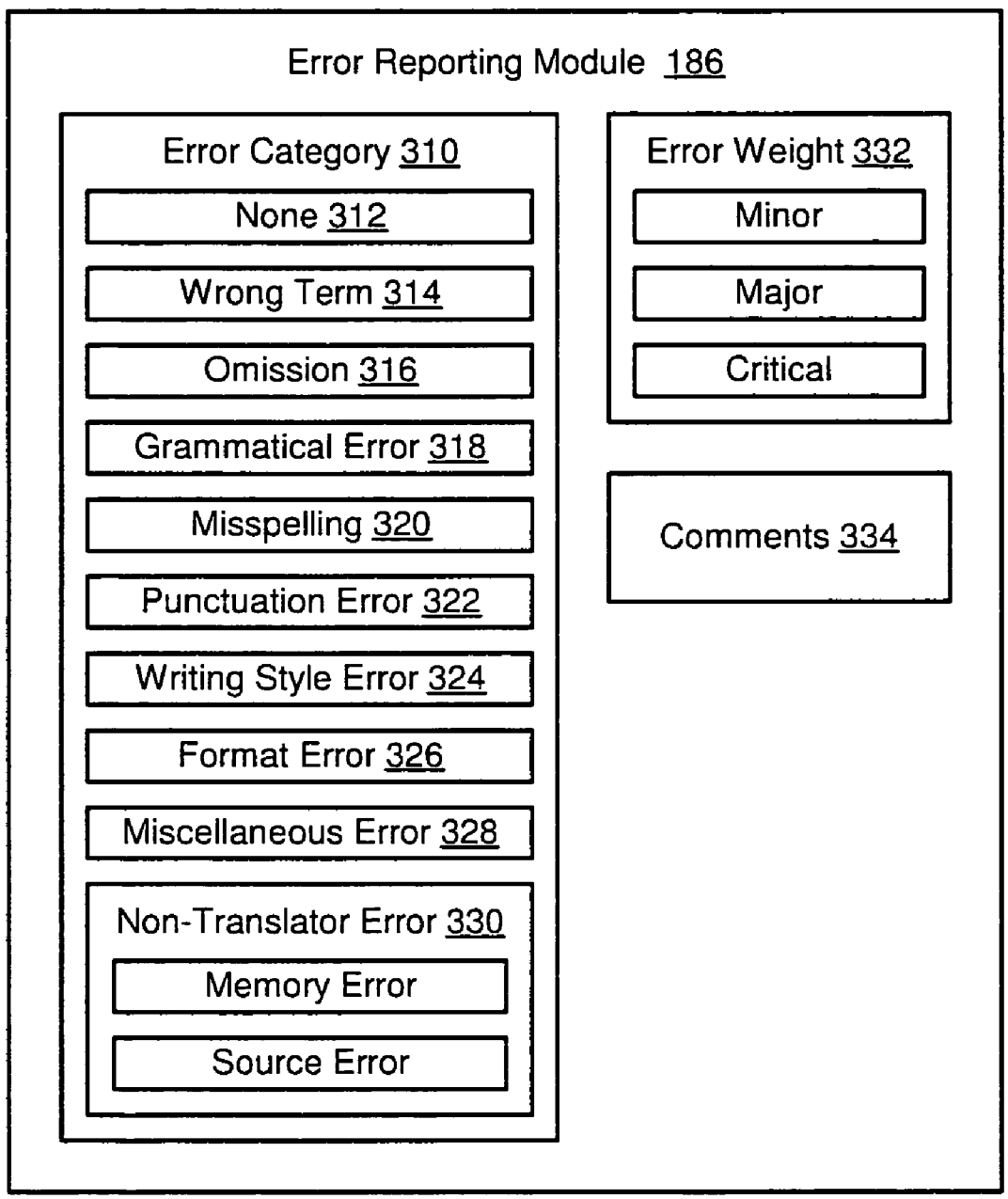
FIG. 12 is a schematic, block, diagram illustrating one embodiment of an error reporting module for incorporation within quality quantifying software in accordance with the present invention.

Referring to FIG. 12, in selected embodiments, during a translation evaluation 266, an error reporting module 186 may assist a reviewer to input the information necessary to generate a log file 190. An error reporting module 186 may present a reviewer with a listing of error categories 310 from which he or she may choose. This listing 310 may correspond to the errors articulated within the error identifier 214 of the metric module 184.

In certain embodiments, a listing of error categories 310 may include a "none" option 312, which may be selected when no errors are identified within the block. Additional options within the listing 310 may include an indication of a wrong term 314, omission 316, grammatical error 318, misspelling 320, punctuation error 322, writing style error 324, format error 326, miscellaneous error 328, non-translator error 330, or the like. A non-translator error 330 may be an error that was not the fault of the translator. Such errors 330 may include memory errors such as pre-translation errors where an error is imported from a resource pair, as well as source errors caused by errors in the source document.

An error reporting module 186 may present a reviewer with a listing of error weights 332 or magnitudes 332 from which he or she may choose. These magnitudes 332 may correspond to the errors' magnitudes as articulated within the error appraiser 206 of the metric module 184. Additionally, an error reporting module 186 may permit a reviewer to enter comments 334 characterizing or explaining a particular concern, error, etc.

In operation, when a reviewer locates an error within a block, he or she may select the type of error from within the listing of error categories 310. The selection of the type of error may automatically dictate the error weight 332 assigned. For example, in certain embodiments, when a reviewer selects "punctuation error" 322, a "minor" weighting 332 may automatically be assigned. In other embodiments, a reviewer may select the weight 332 every time, regardless of the type of error 310 selected. In still other embodiments, certain types of errors 310 may have weights 332 automatically assigned, while other types of errors 310 permit the reviewer to choose the weight 332.

Once the type of error 310 is selected and the proper weight 332 is selected or assigned, a reviewer may add a comment 334 as desired or necessary. The error report may then be submitted. In like manner, the reviewer may then proceed to document the next error identified within the block. This process may continue until all of the errors within a block have been documented. The reviewer may then progress to the next block, and the error documentation process may continue.

Figure 13:
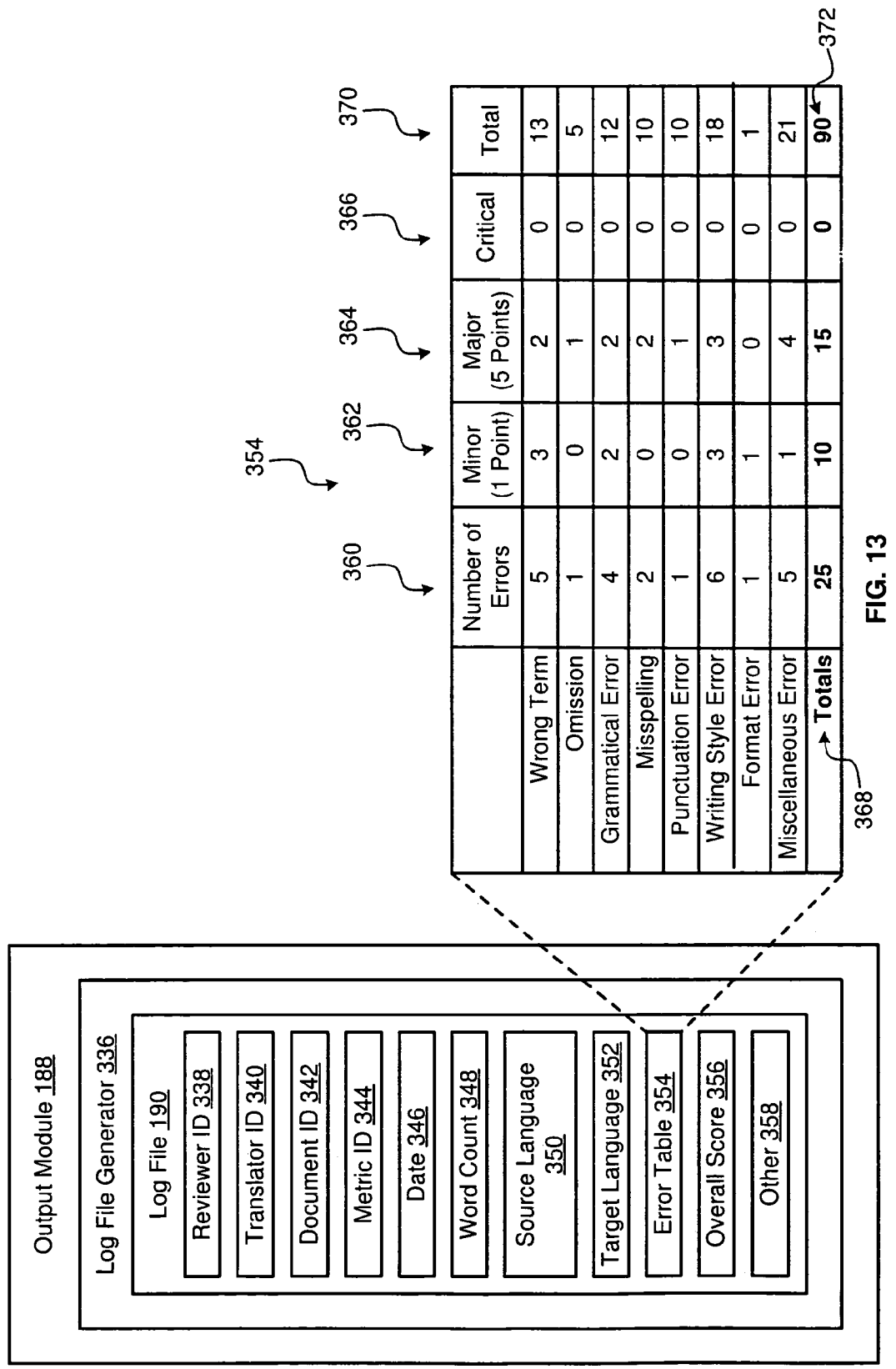
FIG. 13 is a schematic, block, diagram illustrating one embodiment of an output module for incorporation within quality quantifying software in accordance with the present invention.

Referring to FIG. 13, in selected embodiments, an output module 188 may compile all of the error reports produced by the error reporting module 186 to generate a log file 190 characterizing the particular translation. In certain embodiments, an output module 188 may include a log file generator 336 specifically to perform this compiling and generating function.

A log file 190 in accordance with the present invention may include any information that may be useful in characterizing a translation. For example, in selected embodiments, a log file 190 may include a reviewer identification 338, translator identification 340, document identification 342, metric identification 344, date information 346 (e.g., date of translation, date of review, etc.), total word count 348, source language 350, target language 352, error table 354, overall score 356 assigned the translation (e.g. total quality index 356), or any other information 358 that may be desired or necessary.

In certain embodiments, an error table 354 may comprise a chart listing the number 360 of errors of each type located within a block or within the collection of blocks selected from the document. The table 354 may also indicate the number 362 of those error that were minor, the number 364 of errors that were major, and the number 366 of errors that were critical. Appropriate summations may produce totals 368 representing the total number of errors located, the total number of minor errors, the total number of major errors, etc.

To tabulate the weighted totals 370 for each type of error, the number 362 of minor errors may be multiplied by the weighting assigned minor errors (e.g., one point), the number 364 of major errors may be multiplied by the weighting assigned major errors (e.g., five points), and the number 366 of critical error may be multiplied by the penalty-type weighting assigned critical errors (e.g., sufficient points to fail the document). The results may then be summed for each error and totaled for all error types to produced the error points 372 corresponding to the document. Calculated in such a manner, the error points 372 represent the number of errors located as well as the magnitude or severity of those errors.

Figure 14:
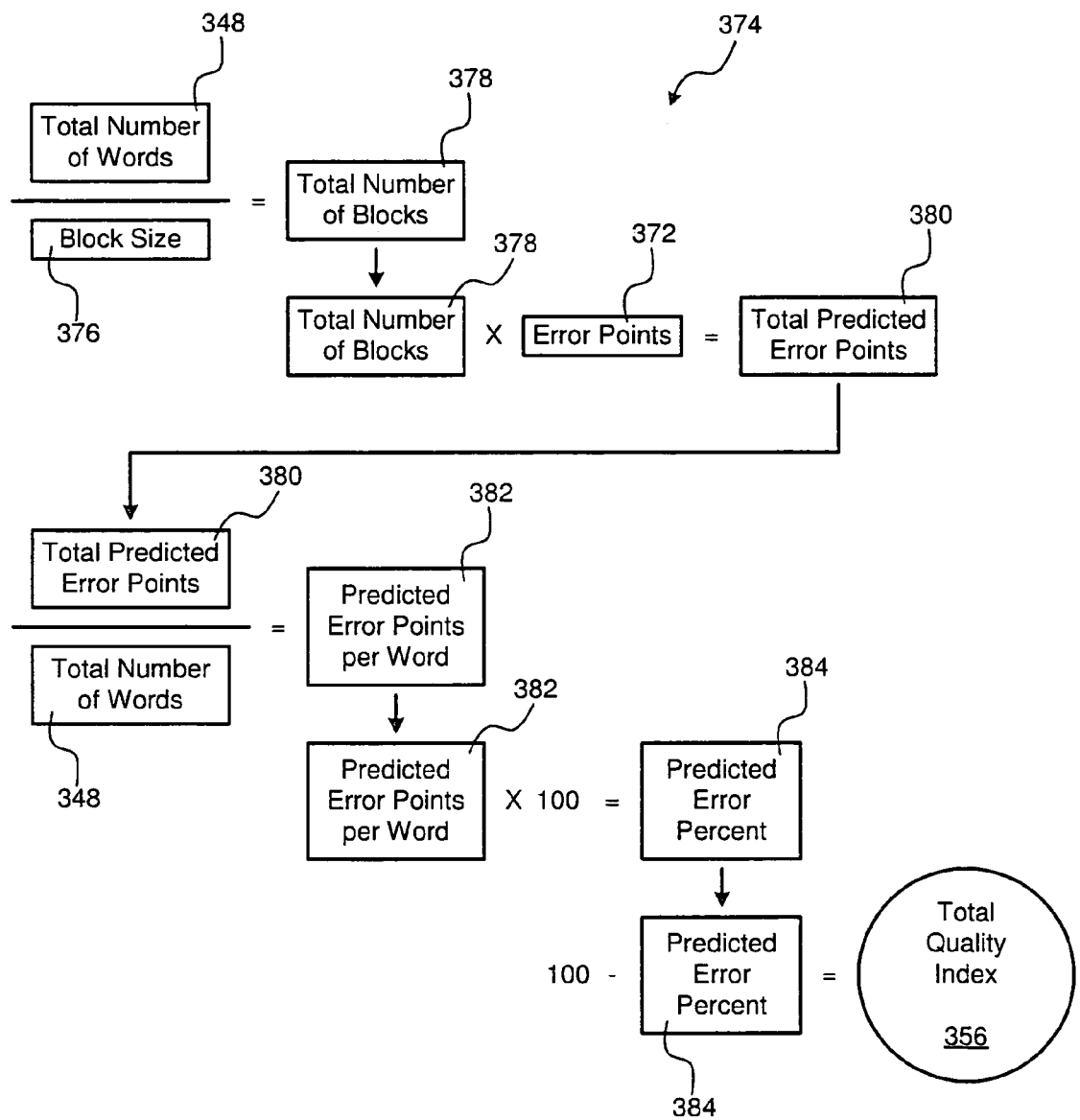
FIG. 14 is a schematic, block, diagram illustrating one method for calculating a total quality index for a translation in accordance with the present invention.

Referring to FIG. 14, there are numerous methods 374, processes 374, or formulations 374 for converting error points 372 into a total quality index 356 useful in quantifying the quality of the translation. In general, these methods simply scale the error points 372, derived from the one or more blocks that were actually reviewed, in some reasonable manner to the entire document.

For example, in one embodiment, it may be assumed that only one block was used in the reviewing process. Accordingly, the process 374 to arrive at the total quality index 356 may begin with dividing the total number 348 of words in the document by the block size 376 or number 376 of words within the block to calculate the number 378 of blocks that fit within the document. This total number 378 of blocks may then be multiplied by the error points 372 found in one block to produce the total predicted error points 380. The total predicted error points 380 may be divided by the total number 348 of words in the document to produce the predicted error points per word 382.

The predicted error points per word 382 may be converted into a percentage 384. This percentage may be used as a total quality index 356. Alternatively, this percentage 384 may be converted into a "positive" percentage rather than a "negative" percentage. For example, some may prefer to employ a total quality index 356 representing the percentage of words correctly translated as opposed to a percentage of words incorrectly translated. Accordingly, the percentage 384 may be modified as desired to produce the desired total quality index 356.

The foregoing illustration generates a total quality index 356 based on a "per-word" basis. Other suitable indices 356 may be presented on a per sentence basis, per-paragraph basis, per-page basis, or the like, as desired. The formula 374 may be adjusted accordingly. Additionally, in embodiments employing error points 372 collected from more than one block, the error points 372 may be converted to error points per block before entering the illustrated formulation 374.

Figure 15:
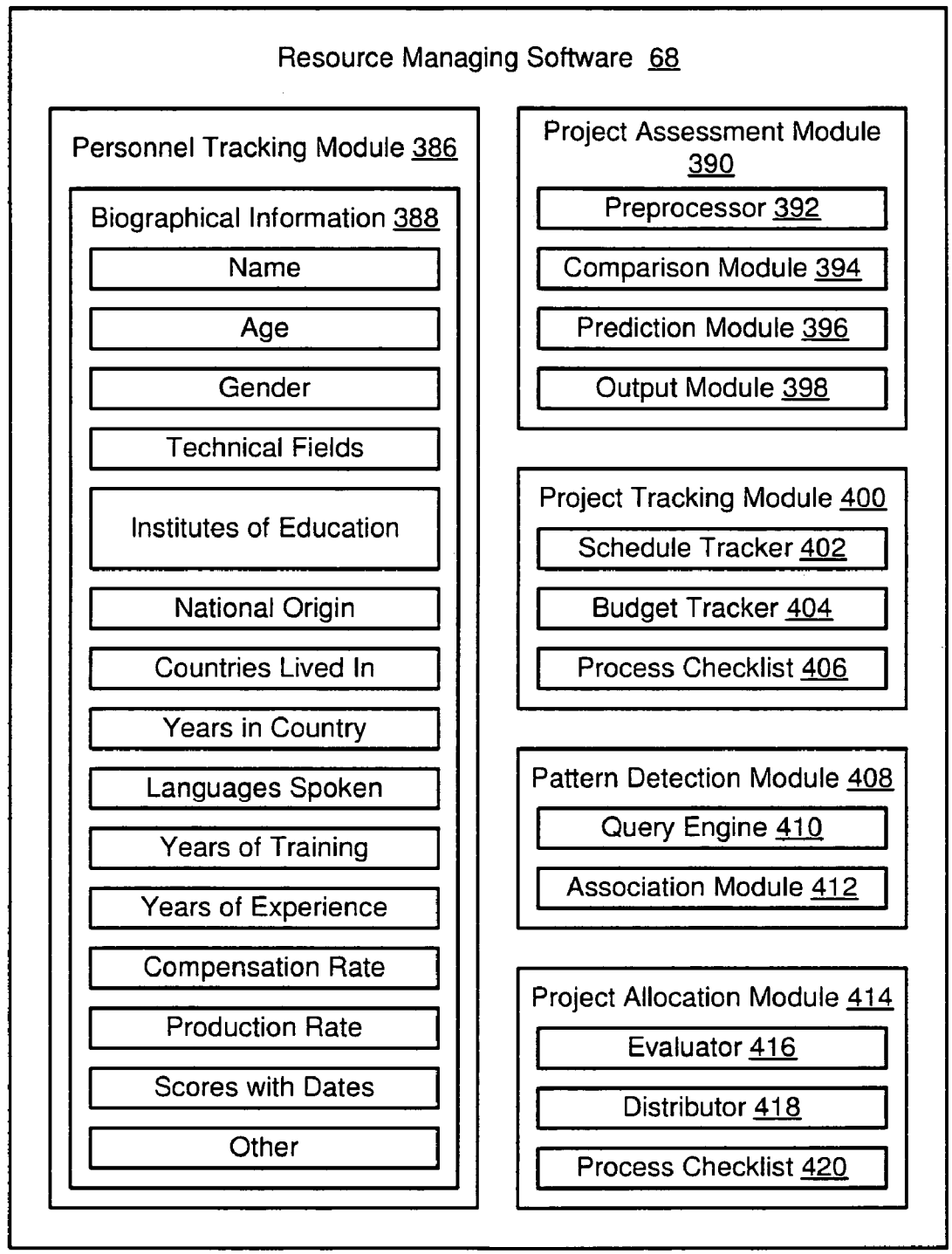
FIG. 15 is a schematic, block, diagram illustrating one embodiment of resource managing software comprising various possible modules in accordance with the present invention.

Referring to FIG. 15, resource managing software 68 in accordance with the present invention may provide any desirable functionality. In general, this functionality may be represented in one or more modules. For example, in selected embodiments, resource managing software 68 may include a personnel tracking module 386. Such a module 386 may record biographical information 388 relating to the translation corps 72, reviewing corps 76, etc.

This biological information 388 may include name, age, gender, technical fields of expertise, institutes of education attended, national origin, a listing of the countries lived in, years in country, languages spoken, years of training, years of translation experience, compensation rate, production rate, translation scores 356 with associated dates, and the like. This biographical information 388 may assist management 80 in identifying trends or patterns. Once identified, these patterns may assist management in refining 114 the allocation of resources.

In selected embodiments, resource managing software 68 may include a project assessment module 390. This module 390 may assist management 80 in preparing quotes for completion of selected projects. In certain embodiments, a project assessment module 390 may include a preprocessor module 392 to determine what portion or fraction of the document to be translated contains words or phrases that have already been translated within the resource pairs 140, dictionary 148, etc. A comparison module 394 may compare this density of pretranslatable material to the density found in similar translations which have already been completed. A prediction module 396 may then use the information provided by the comparison module 394 to predict the costs in translating the new document. An output module 398 may then assist management 80 in generating a quote articulating the various aspects of the contemplated work and the associated cost prediction.

In some embodiments, resource managing software 68 may include a project tracking module 400 to assist management 80 in following the progress of a project as it progresses towards completion. In certain embodiments, a project tracking module 400 may include a schedule tracker 402 to ensure that the various tasks of translation, review, etc. occur in a timely manner, a budget tracker 404 monitoring the allocation and consumption of economic resources associated with a project, and a process checklist 420 providing an overview of the translation process and ensuring that all the required tasks are properly and timely performed.

In certain embodiments, resource managing software 68 may include a pattern detection module 408 to assist management 80 in identifying statistically significant patterns that may be used to refine 114 the allocation of resources. To assist in this endeavor, a pattern detection module 408 may include a query engine 410 to facilitate manual or automatic searching of the information contained within the database 70. A pattern detection module 408 may also include an association module 412 to assist management 80 in isolating the factors reasonable for particular consequences.

In selected embodiments, resource managing software 68 may include a project allocation module 414 to assist management 80 in managing the flow of projects to and from the translation corps 72, reviewing corps 76, and so forth. In some embodiments, a project allocation module 414 may function as a work flow server. To provide such functionality, a project allocation module 414 may include an evaluator 416 to assist in making determinations regarding which translators and reviewers receive which projects. A distributor 418 may assisting in delivering the project to the selected translator or reviewer. For example, a distributor 418 may send the project to a translator via e-mail. Alternatively, a distributor 418 may simply post the project on a secure web site were a translator, reviewer, or the like may log on and retrieve it. A project allocation module 414 may also include a process checklist 420 providing an overview of the translation process and ensuring that all the required tasks are properly and timely performed.

The present invention may be embodied in other specific forms without departing from its basic structures or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed and desired to be secured by United States Letters Patent is:

1. A system to control discretion of a human reviewer of language translations, the system comprising:
    a computer comprising a processor and memory device operably connected to one another;
    a source text stored within the memory device and corresponding to a first language;
    a target text stored within the memory device and comprising a translation of the source text in a second language, distinct from the first language; and
    a plurality of executables stored on the memory device and executed by the processor, the plurality of executables comprising:
        a metric module identifying a test sample containing substantially less than all the source text and comprising one or more blocks,
        the metric module, wherein the one or more blocks each comprise a matched set having a source portion selected from the source text and a corresponding target portion selected from the target text,
        the metric module further comprising a block definer, block selector, and error identifier,
        the metric module, wherein the block definer controls the length of text forming the one or more blocks and determines the number of words contained within one of the source portion and target portion of at least one of the one or more blocks,
        the metric module, wherein the block selector controls selection of the one or more blocks and determines at random the location of one of the source portions and target portion within the source text of at least one of the one or more blocks,
        the metric module, wherein the error identifier defines error categories, each category thereof selected from an error in language translation to be detected if existing in the translation,
        an error reporting module constraining error reporting by a human reviewer of the translation by presenting to the human reviewer a listing of the error categories from which the human reviewer may exclusively select and report errors in the translation,
        an output module compiling the errors selected by the human reviewer for the test sample, and
        the output module further characterizing errors in the translation by scoring the quality of the translation.

2. The system of claim 1, wherein:
    the memory device further stores a plurality of dictionary entries matching words in the first language to words in the second language; and
    the location is selected according to changes in the concentration of words contained within one of the source text and target text and also contained within the plurality of dictionary entries.

3. The system of claim 1, wherein the memory device comprises one or more electronic storage units.

4. The system of claim 3, wherein at least one of the one or more electronic storage units is positioned remotely from the processor.

5. The system of claim 4, wherein at least one of the one or more electronic storage units is connected to the processor via the Internet.

6. The system of claim 1, wherein the error categories comprise wrong term, omission, grammatical error, misspelling, and punctuation error.

7. A system comprising:
    a first computer comprising a first processor and first memory device operably connected to one another;
    a second computer comprising a second processor and second memory device operably connected to one another;
    a first plurality of executables stored on the first memory device and executed to assist a human translator in translating a source text corresponding to a first language into a target text corresponding to a second language, distinct from the first language; and
    a second plurality of executables stored on the second memory device and executed by the second processor, the second plurality of executables operably assisting a human reviewer score the quality of the translating, the second plurality of executables comprising:
        a metric module identifying a test sample consisting of one or more blocks,
        the metric module, wherein each of the one or more blocks comprises a matched set having a source portion selected from the source text and a corresponding target portion selected from the target text,
        the metric module, wherein the one or more blocks collectively are substantially less than the entire source text,
        the metric module, further comprising a block definer, block selector, and error identifier,
        the metric module, wherein the block definer controls the length of text forming the one or more blocks,
        the metric module, wherein the block selector controls the location of the one of the one or more blocks by determining at random the source portions and target portion within the source text of at least one of the one or more blocks,
        the metric module, wherein the error identifier defines error categories, each category thereof selected from an error in language translation to be detected in the translating,
        an error reporting module constraining error reporting by a human reviewer of the translation by presenting to the human reviewer a listing of the error categories from which the human reviewer may exclusively select and report errors in the translation, an output module compiling the errors selected by the human reviewer for the test sample, and the output module further characterizing errors in the translation by scoring the quality of the translation.

8. The system of claim 7, wherein the number of words contained within the source portion of at least one of the one or more blocks is dictated by the block definer.

9. The system of claim 8, wherein the location of the source portion within the source text of at least one of the one or more blocks is dictated by one of an explicit formula and a random selection.

10. The system of claim 7, further comprising an electronic storage device receiving the source text and target text from the first computer.

11. The system of claim 10, wherein the second computer receives the source text and the target text from the electrical storage device.

12. The system of claim 11, wherein the electrical storage device, first computer, and second computer are interconnected via a network.

13. The system of claim 12, wherein the network comprises the Internet.

14. A method to control discretion of a human reviewer of language translations, the method comprising:

selecting a computer having a processor and a memory device operably connected to one another;

selecting a source text corresponding to a first language;

selecting a target text comprising a translation of the source text into a second language, distinct from the first language and comprising substantially less than all of the source text;

executing by the processor, selected computer instructions comprising a metric module, an error reporting module, and an output module;

identifying by the metric module one or more blocks, each block comprising a matched set having a source portion, comprising substantially less than all the source text, selected from the source text and a corresponding target portion selected from the target text;

controlling by a block definer within the metric module a length of text forming the one or more blocks;

controlling by a block selector, in the metric module, at random, a location of the one or more blocks, controlling by an error identifier, in the metric module, error categories, each category thereof selected from an error in language translation;

constraining, by the error reporting module, a human reviewer of the translation by presenting to the human reviewer a listing of the error categories from which the human reviewer may exclusively select to report errors in the translation;

reviewing by the human reviewer the one or more blocks to identify translation errors therein;

selecting by the human reviewer, from the listing, selected error categories corresponding to the translation errors; and characterizing, by the output module, errors in the translation by scoring the quality of the translation.

* * * * *